Nov. 25, 1969 R. L. PAQUIN Re. 26,724

REFRIGERATED TUMBLER

Original Filed May 2, 1966

INVENTOR
ROGER L. PAQUIN
BY
ATTORNEYS

United States Patent Office

Re. 26,724
Reissued Nov. 25, 1969

26,724
REFRIGERATED TUMBLER

Roger L. Paquin, Killingworth, Conn., assignor to Glacier Ware, Inc.

Original No. 3,360,957, dated Jan. 2, 1968, Ser. No. 546,971, May 2, 1966. Application for reissue June 21, 1968, Ser. No. 753,802
Int. Cl. F25d *3/08*
U.S. Cl. 62—457 2 Claims

Matter enclosed in heavy brackets [ ] appears in the original patent but forms no part of this reissue specification; matter printed in italics indicates the additions made by reissue.

ABSTRACT OF THE DISCLOSURE

A double walled tumbler which can be used without a persons lip becoming frozen thereto by providing a lip of insulating material such as polyethylene extending above the refrigerant hermetically sealed therein.

This invention relates to an improved double-walled tumbler for serving drinks requiring refrigeration.

Drinks such as iced tea, soft drinks, and many warm-climate beverages, especially in tropical climates, need refrigeration after being served, either to cool them then or to keep them cool after serving, if they have been previously cooled. Double-walled tumblers with a refrigerant liquid between walls enable such refrigeration without having to dilute the drink, as occurs when ice is put directly into the glass.

When refrigerant in a double-walled tumbler is frozen prior to use, it keeps the beverage cool or cools a warm beverage. However, it is difficult to drink directly from such a tumbler because the edge of the tumbler is too cold. For example, the drink may be about 40° F., but the refrigerant may be about 20° F.—a temperature which can even cause a person's lip to stick to the tumbler.

The present invention solves this problem and provides a double-walled refrigerant-employing tumbler which can safely and comfortably be drunk directly from. It does this by providing, as an integral part of the tumbler, a lip that extends a substantial distance above the refrigerant, so that the person's mouth is insulated from the cold refrigerant and even from the beverage below the lip.

This and other objects, advantages, and features of the invention will appear from the following description of a preferred embodiment thereof.

Figure 1:
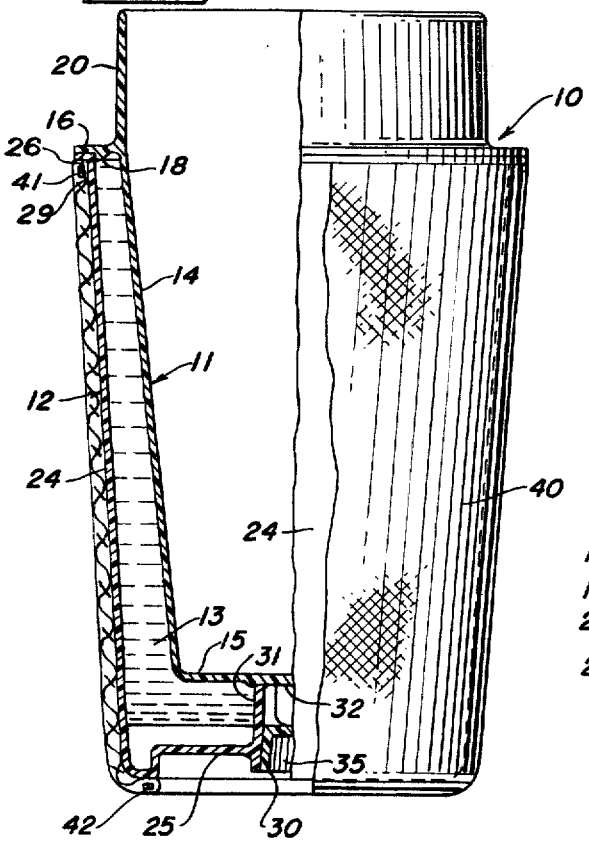
FIG. 1 is a view in elevation and partly in section of a tumbler embodying the principles of the invention.
Figure 2:
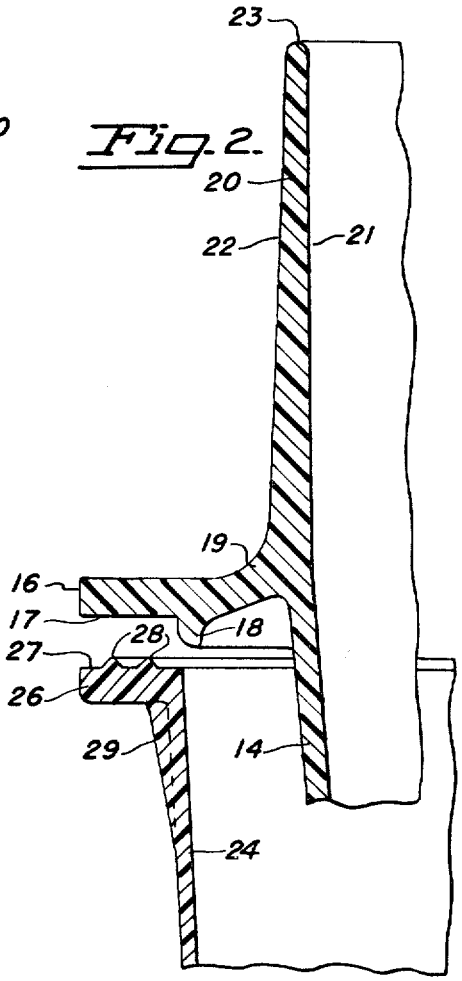
FIG. 2 is a fragmentary enlarged view in elevation and in section of an upper portion of the tumbler of FIG. 1 before the two receptacles are sealed together.
Figure 4:
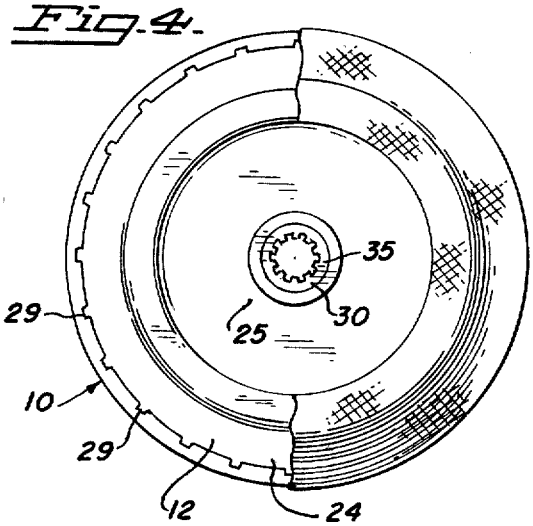
FIG. 4 is a bottom plan view of the tumbler of FIG. 1.
Figure 3:
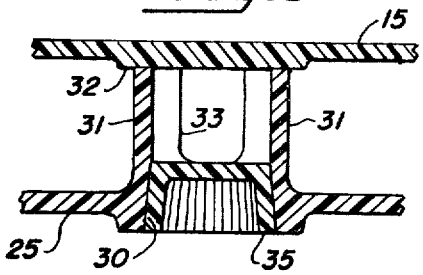
FIG. 3 is a fragmentary enlarged view in elevation and in section of a bottom portion of the tumbler in FIG. 1.

The drawings show a round tumbler 10 comprising an inner receptacle 11 and an outer receptacle 12, with a refrigerant liquid 13 between them.

The inner receptacle 11 has a generally vertical side wall 14 which preferably tapers inwardly at about 6° from its upper end to a bottom wall 15. At the upper end of the side wall 14 is a radially outwardly extending flange 16. The flange 16 has a flat lower face 17 surrounding a depending annular projection 18. A curved portion 19 of the flange 16 connects it to the side wall 14 and to a lip 20 which extends from the upper end of the side wall 14 for a substantial distance above the flange 16.

The lip 20, like the rest of the receptacle 11 with which it is integral, is made from an insulating plastic such as polyethylene. It is substantially cylindrical, preferably tapering inwardly toward the top about 1° on each of its inner and outer surfaces 21 and 22. It preferably has a smoothly rounded upper edge 23. This lip 20 serves to insulate the user's lips from the refrigerant liquid 13, so that the tumbler is comfortably used.

The outer receptacle 12, also made from a suitable plastic, such as polyethylene and preferably from the same plastic as the inner receptacle 11, also has a generally vertical side wall 24 that preferably slopes in and down at about 4° to the vertical to a bottom wall 25. At its upper edge the receptacle 11 has a flange 26 whose upper surface 27 is initially provided with a plurality of annular ribs 28. Also, the upper part of the side wall 25 is provided with a plurality of vertical ribs 29, so that they can be engaged by a chuck of a spin-weld machine.

In assembly, the first step is to spin-weld the two receptacles 11 and 12 together at their flanges 16 and 26. With the ribs 29 in a chuck, the relative movement of the flanges 26 and 16 and the friction of their contact melts the ribs 28 and fuses the faces 17 and 27 together to seal and secure them to each other. Then the assembly is inverted, and the space between the receptacles 11 and 12 is filled with the refrigerant 13.

For this purpose, the bottom wall 25 is provided with an integral inlet fitting 30 having a cylindrical wall 31 extending up to support a thickened portion 32 of the bottom wall 15. A plurality of slots 33 enable the refrigerant to pass in from the inlet 30 to the space between the receptacles. The space is preferably filled about 85% of a suitable refrigerant liquid 13, such as a mixture of water with glycerine or a glycol. Then the bottom opening is closed by a suitable plug 35, which may be spin-welded to the fitting 30, especially if made from the same plastic.

To provide insulation for the tumbler 10, a stretch knit sock 40 may be placed around the side wall 24 of the outer receptacle 12. The tubular sock 40 preferably has an elastic 41 built into its upper end and an elastic 42 built into its lower end. The sock 40 may be provided in a variety of colorful and decorative designs. It is quite effective in its insulation, not only extending the period over which the refrigerant 13 is effective but also giving the user a more comfortable feel, by not being disagreeably cold to the touch. It also prevents condensation of moisture and the formation of frost.

The tumbler 10, before use, is placed upside down in a freezer to freeze the refrigerant 13, and is then inverted and a drink poured into the inner receptacle 11, up to about the level of the flange 16. Very rapid heat transfer is provided between the beverage and the refrigerant 13, so that a room temperature beverage almost immediately is made palatably cool and is kept cool for an extended period. It can be refilled several times before losing its cooling power.

To those skilled in the art to which this invention relates, many changse in construction and widely differing embodiments and applications of the invention will suggest themselves without departing from the spirit and scope of the invention. The disclosures and the description herein are purely illustrative and are not intended to be in any sense limiting.

I claim:

1. A double-walled drink-refrigerating tumbler, including in combination:

an inner receptacle [of insulating plastic] for holding a beverage, having a generally vertical first side wall and a first bottom wall, a radially outwardly extending first flange at the top of said first side wall and having a lower face, and a generally cylindrical vertical lip *of insulating plastic* extending upwardly from said first side wall, a substantial distance above said first flange, an outer receptacle of insulating plastic having a generally vertical second side wall higher than said first side wall, a second bottom wall, and a radially outwardly extending second flange at the upper end of said second side wall, *the second flange having* [and having] an upper face secured to *said lower face of said first flange to provide an uninterrupted fluid seal between said inner and outer receptacles,* [and sealed to said lower face of said first flange to secure said inner and outer receptacles together,] said second side wall thereby being spaced outwardly from said first side wall and said first bottom wall being spaced above said second bottom wall, to provide a *fluid-tight* refrigerant-containing space, and a refrigerant liquid filling most of said space and lying below said flanges and serving, after being initially cooled to a desired temperature, to cool and keep cool for a period of time a beverage contained in said inner receptacle up to the height of said flanges, said lip enabling a user to drink the beverage while being insulated from the refrigerant liquid.

[a plurality of ribs on the outer wall of the outer receptacle below and contiguous the second flange, the faces being secured by molten concentric ribs on one face fused with the other face, said insulating plastic being polyethylene, and a stretch-knit sock covering said second side wall up to said second flange and having elastic retainers at each end, one just beneath said second flange and one at the bottom of said second wall.]

*2. The device of claim 1 further including a plurality of ribs on the outer wall of the outer receptacle below and contiguous the second flange, and said insulating plastic being polyethylene.*

References Cited

The following references, cited by the Examiner, are of record in the patented file of this patent or the original patent.

UNITED STATES PATENTS

| | | | |
|---|---|---|---|
| 2,622,415 | 12/1952 | Landers et al. | 62—457 |
| 2,926,508 | 3/1960 | Moon | 62—457 |
| 3,205,678 | 9/1965 | Stoner | 62—457 |
| 3,269,144 | 8/1966 | Poris | 62—457 |
| 3,302,427 | 2/1967 | Stoner et al. | 62—457 |

LLOYD L. KING, Primary Examiner